(12) United States Patent
Kolar et al.

(10) Patent No.: US 12,199,839 B2
(45) Date of Patent: Jan. 14, 2025

(54) DETECTING APPLICATION PERFORMANCE BREAKING POINTS BASED ON UNCERTAINTY AND ACTIVE LEARNING

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR); Mukund Yelahanka Raghuprasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 118 days.

(21) Appl. No.: 17/708,322

(22) Filed: Mar. 30, 2022

(65) Prior Publication Data
US 2023/0318936 A1 Oct. 5, 2023

(51) Int. Cl.
*H04L 41/5009* (2022.01)
*H04L 41/5067* (2022.01)
*H04L 43/045* (2022.01)
*H04L 43/08* (2022.01)

(52) U.S. Cl.
CPC ...... *H04L 41/5009* (2013.01); *H04L 41/5067* (2013.01); *H04L 43/045* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 10,355,938 B2 | 7/2019 | Saha et al. | |
| 10,411,972 B2 | 9/2019 | Mccabe et al. | |
| 10,439,915 B2 | 10/2019 | Chris et al. | |
| 10,511,690 B1 | 12/2019 | Chatterjee | |
| 10,924,408 B2* | 2/2021 | Raileanu | H04L 45/22 |
| 2010/0268524 A1* | 10/2010 | Nath | H04L 67/306 |
| | | | 709/224 |
| 2014/0071832 A1* | 3/2014 | Johnsson | H04L 43/10 |
| | | | 370/242 |

(Continued)

OTHER PUBLICATIONS

Malik et al. "SLA-Aware Routing Strategy for Multi-Tenant Software-Defined Networks", 2020 ISCC, Jul. 7, 2020. DOI: 10.1109/ISCC50000.2020.9219653. (Year: 2020).*

(Continued)

*Primary Examiner* — Natisha D Cox
(74) *Attorney, Agent, or Firm* — BEHMKE INNOVATION GROUP LLC; James M. Behmke; James J. Wong

(57) ABSTRACT

In one embodiment, a device obtains path metrics for a network path via which traffic for an online application is conveyed. The device models uncertainty of an application experience metric predicted for the online application based on the path metrics. The device identifies, based on the uncertainty of the application experience metric modeled by the device, a breaking point in the path metrics at which the application experience metric predicted for the online application is expected to switch from being acceptable to being degraded. The device provides the breaking point in the path metrics for display.

16 Claims, 13 Drawing Sheets

(56) References Cited

U.S. PATENT DOCUMENTS

| | | | |
|---|---|---|---|
| 2017/0005904 A1* | 1/2017 | Sharma | G06F 11/3409 |
| 2018/0123930 A1* | 5/2018 | Zhang | H04L 43/55 |
| 2018/0359172 A1* | 12/2018 | Yadav | H04L 45/70 |
| 2019/0036808 A1* | 1/2019 | Shenoy | H04L 45/64 |
| 2019/0386918 A1* | 12/2019 | Iyer | H04L 43/0829 |
| 2020/0084142 A1* | 3/2020 | Bochkar | H04L 47/125 |
| 2020/0106856 A1* | 4/2020 | Megahed | H04L 41/145 |
| 2020/0296023 A1* | 9/2020 | Kumar | H04L 43/103 |
| 2020/0342346 A1* | 10/2020 | Wulff | H04L 12/4633 |
| 2020/0382385 A1* | 12/2020 | Vasseur | H04L 43/20 |
| 2020/0389390 A1* | 12/2020 | Vasseur | H04L 47/724 |
| 2021/0092036 A1 | 3/2021 | Jain et al. | |
| 2022/0052927 A1* | 2/2022 | Yelahanka Raghuprasad | H04L 41/5025 |
| 2022/0239720 A1* | 7/2022 | Madanapalli | H04N 21/44209 |

OTHER PUBLICATIONS

Katsikogiannis et al. "Optimizing SLA-driven adaptive routing", 2016 ISCC, Jun. 27, 2016. DOI: 10.1109/ISCC.2016.7543807. (Year: 2016).*

Katsikogiannis et al. "Policy-Based QoS Management for SLA-Driven Adaptive Routing", Journal of Comm'ns and Networks, Jun. 2013. DOI: 10.1109/JCN.2013.000053. (Year: 2013).*

"Gaussian Process", online: https://en.wikipedia.org/w/index.php?title=Special: DownloadAsPdf&page=Gaussian_process&action=show-download-screen, Feb. 19, 2022, accessed Mar. 17, 2022, 12 pages, Wikimedia Foundation, Inc.

"Opus Examples—Audio Samples", online: https://opus-codec.org/examples/, accessed Mar. 29, 2022, 2 pages.

* cited by examiner

DETECTING APPLICATION PERFORMANCE BREAKING POINTS BASED ON UNCERTAINTY AND ACTIVE LEARNING

TECHNICAL FIELD

The present disclosure relates generally to computer networks, and, more particularly, to detecting application performance breaking points based on uncertainty and active learning.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling path metrics such as delay, jitter, packet loss, etc. for a network path can be used to predict when that path will violate the SLA of the application and reroute the traffic, in advance. However, different applications may have very different tolerances to the same path metrics. For instance, certain audio codecs for voice applications may be resilient to packet loss up to 30%, while others cannot tolerate that high of a threshold. Even in cases in which machine learning is able to identify ranges of 'good' and 'bad' path metrics, this does little in the way of identifying the breaking points at which the application experience actually degrades for a certain application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
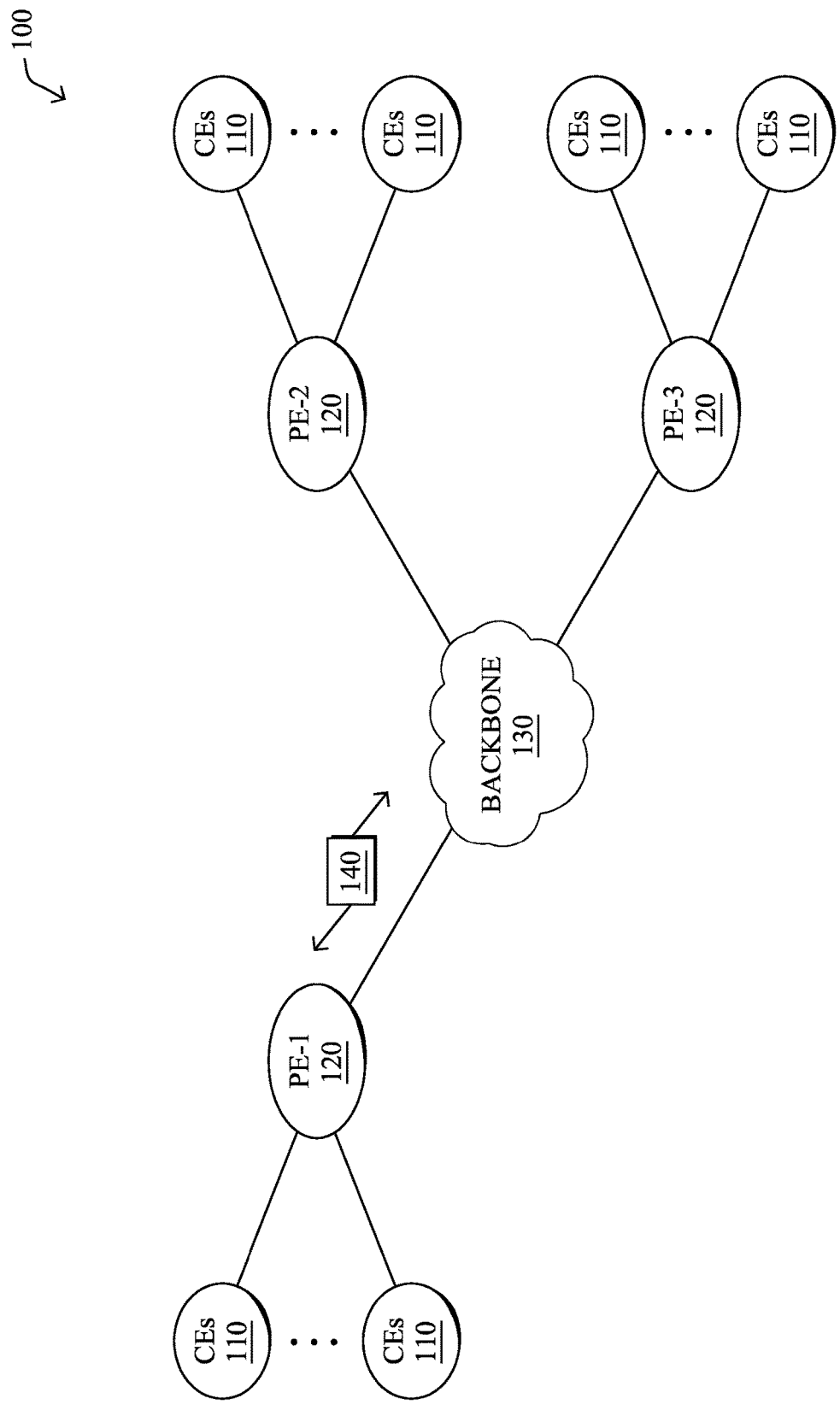
FIGS. 1A-1B illustrate an example communication network.

According to one or more embodiments of the disclosure, a device obtains path metrics for a network path via which traffic for an online application is conveyed. The device models uncertainty of an application experience metric predicted for the online application based on the path metrics. The device identifies, based on the uncertainty of the application experience metric modeled by the device, a breaking point in the path metrics at which the application experience metric predicted for the online application is expected to switch from being acceptable to being degraded. The device provides the breaking point in the path metrics for display.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
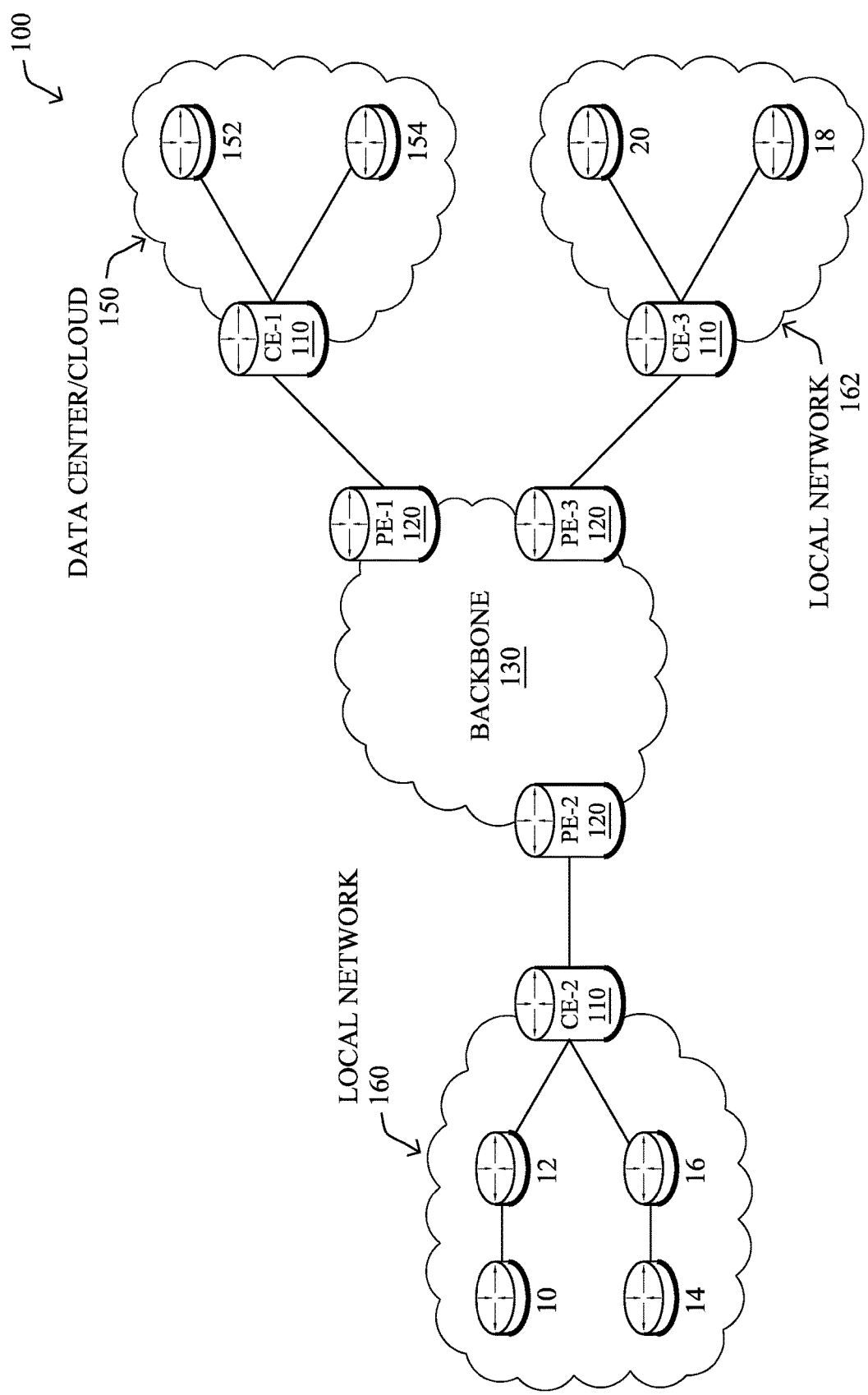

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
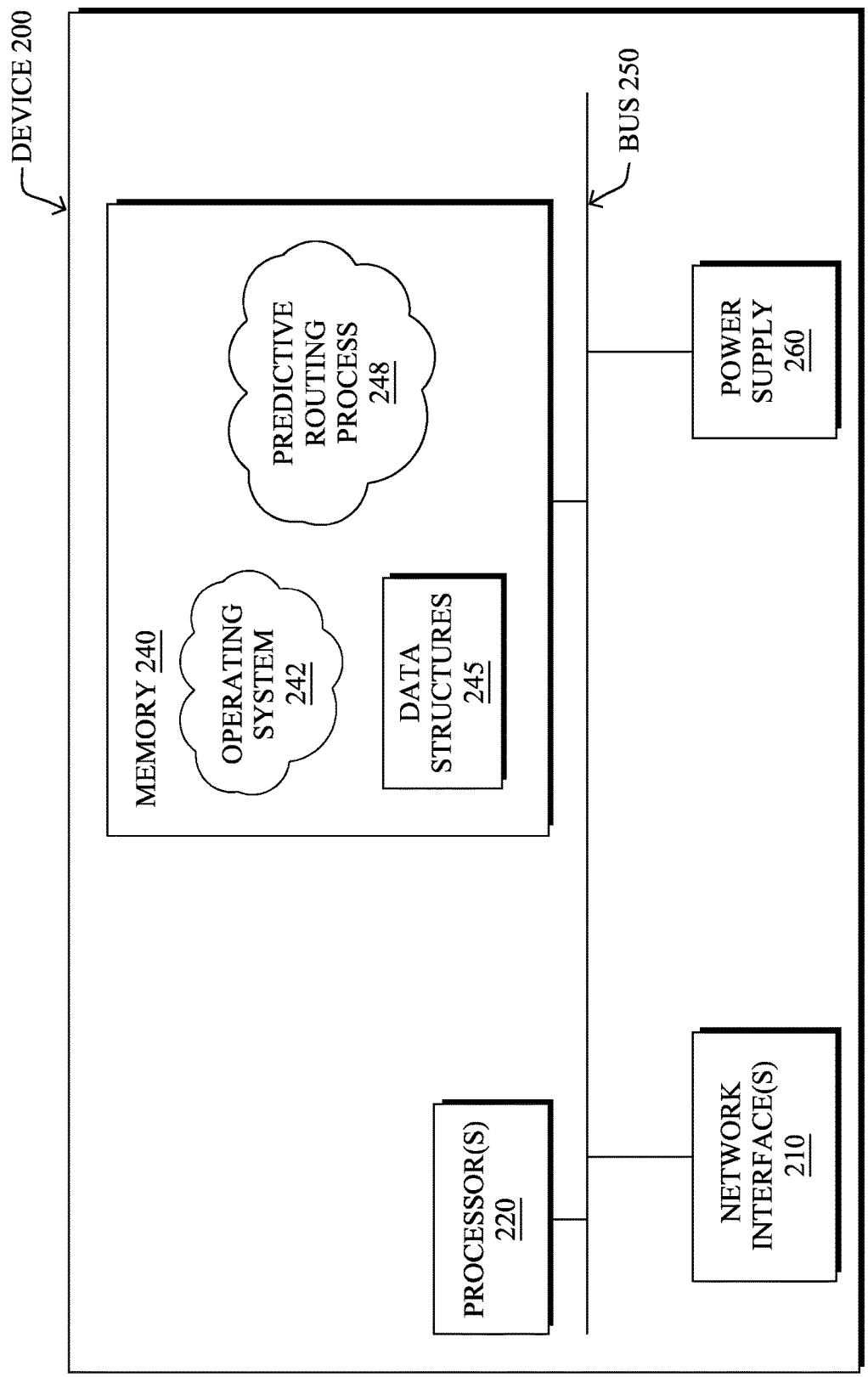
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
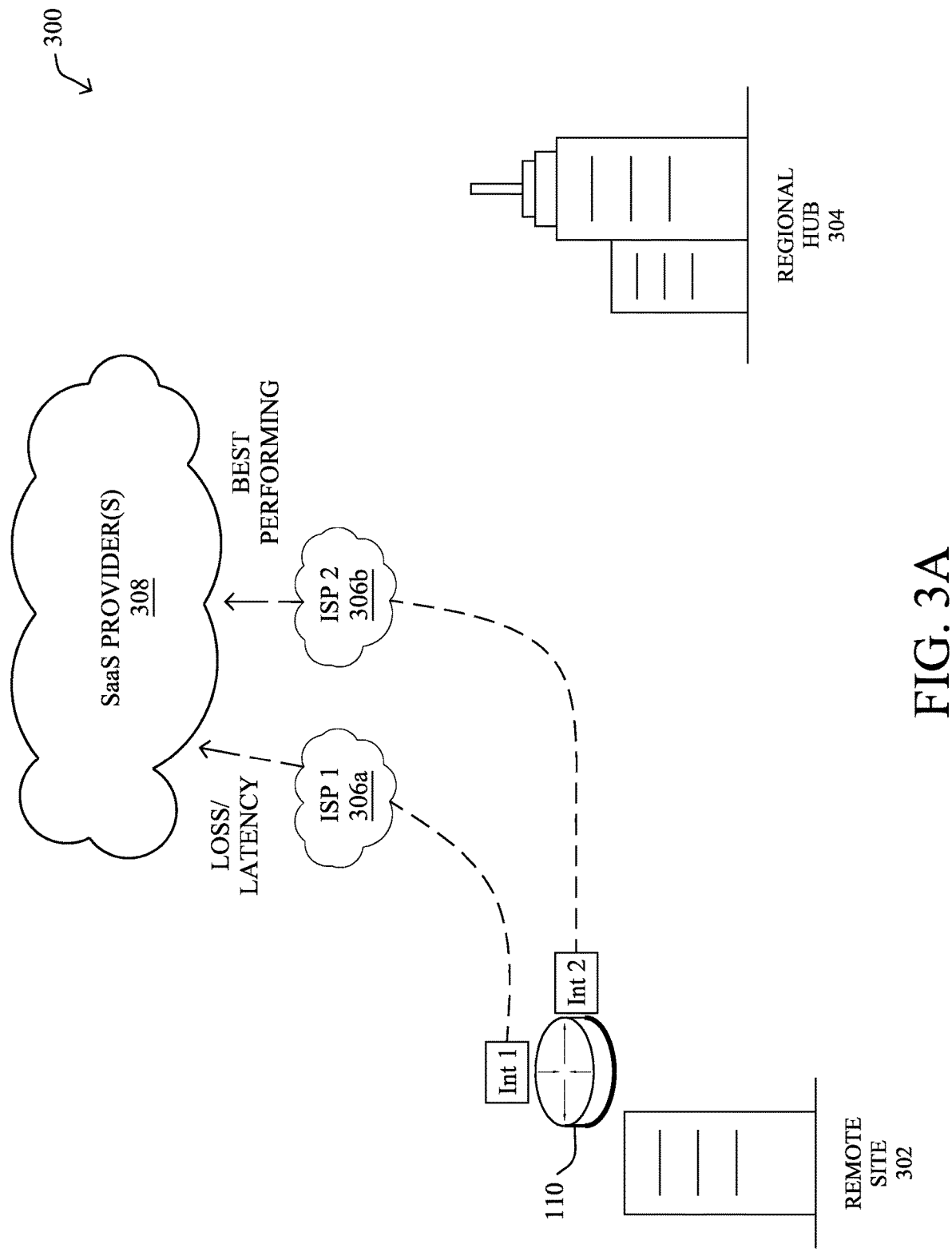
FIGS. 3A-3B illustrate example network deployments.
Figure 3B:
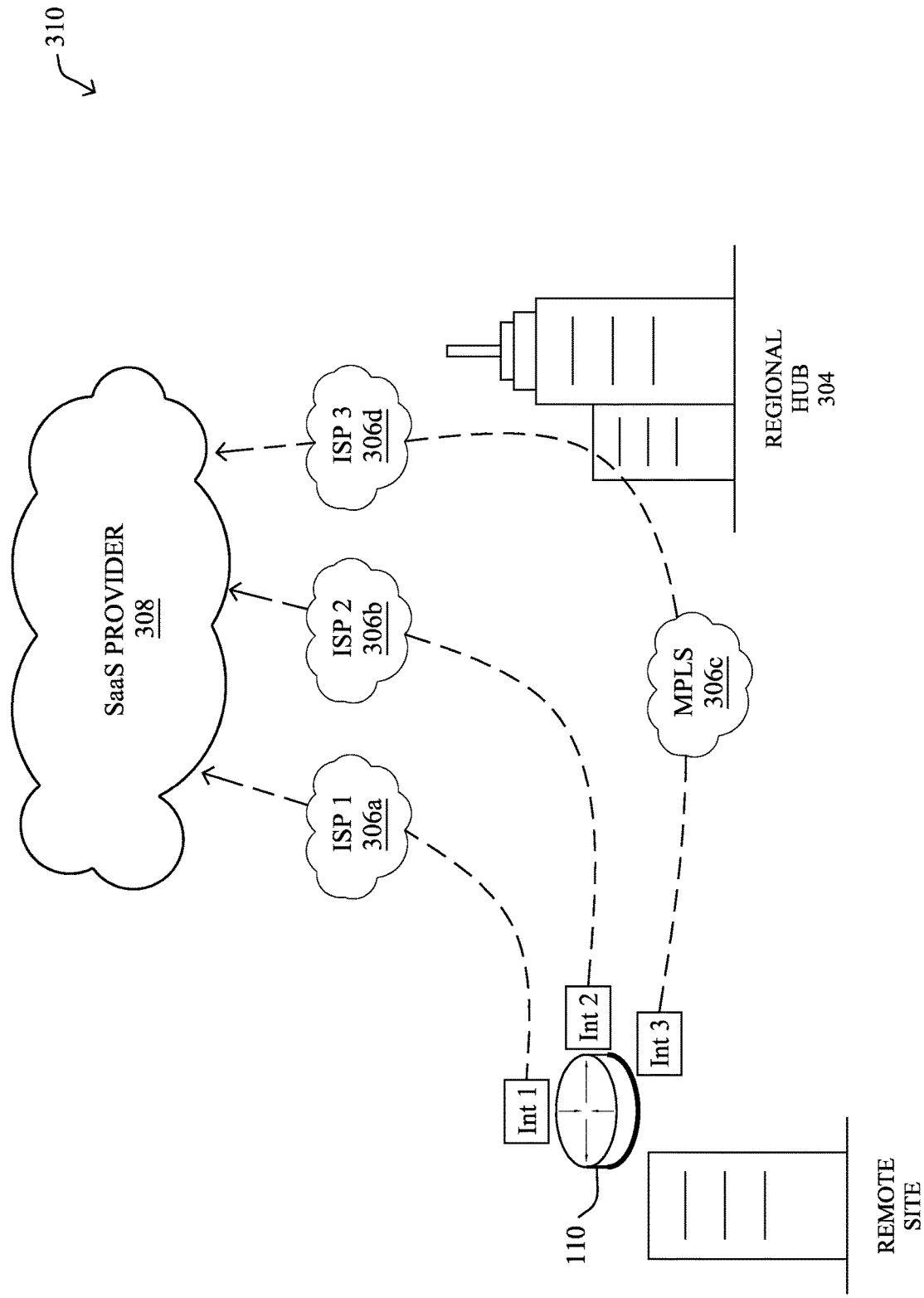

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
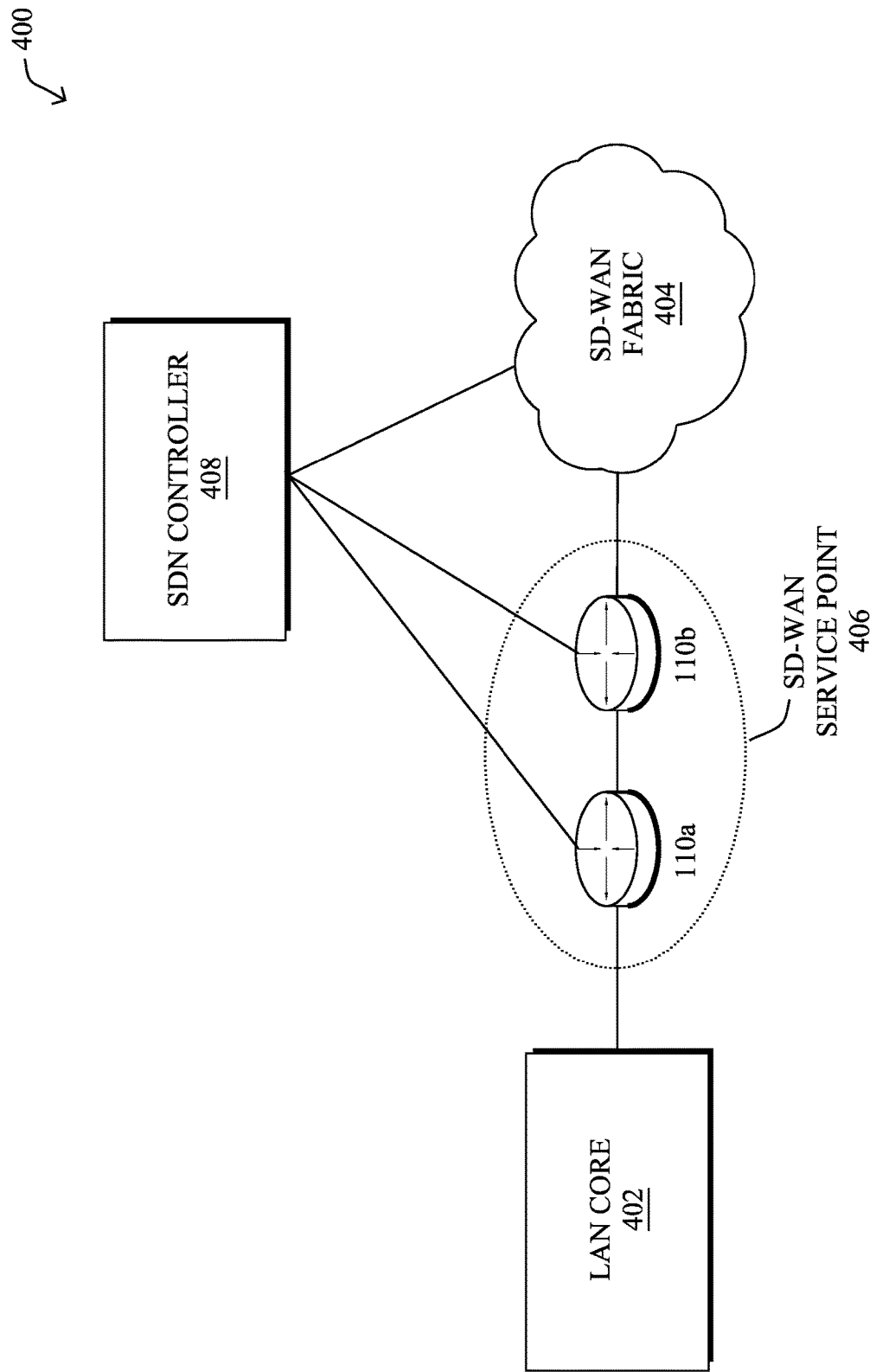
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing. CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
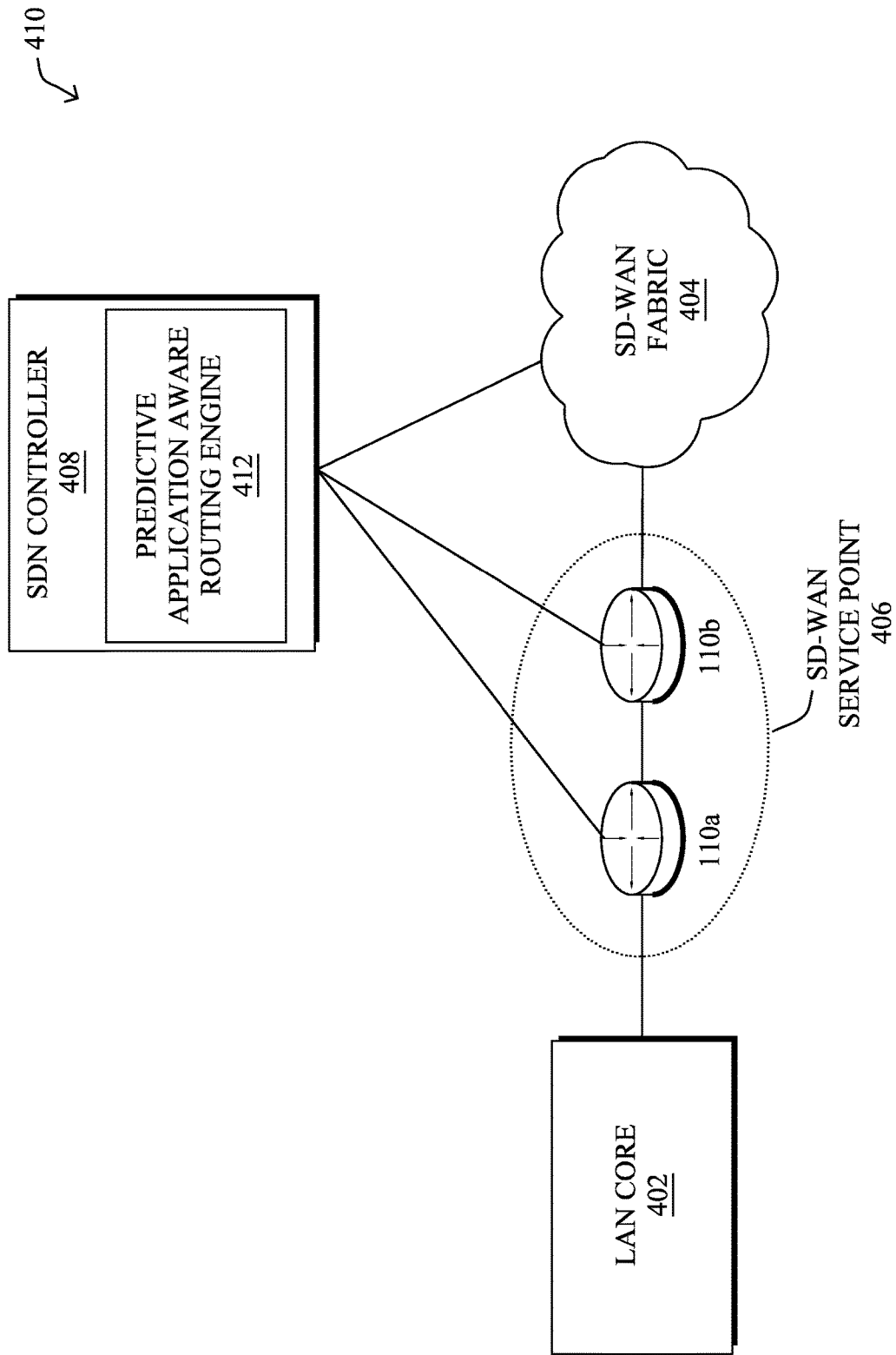

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As would be appreciated, modern SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:

Obtaining user feedback directly from the application
Applying traffic analytics, such as by analyzing Netflow records that include extra metrics like Application Response Time (ART)
Sending synthetic path probes to measure networking metrics to each SaaS application from each location. These probes are 'synthetic' in that they seek to mimic the actual characteristics of the traffic of the application under scrutiny.

The first approach above is rarely used today because of its complexity, but can still be used with the techniques herein. Note that relying on direct user feedback to drive routing decisions would also require supporting application programming interfaces (APIs) and the relevant network telemetry, in order to optimize the routing. The second and third approaches above are well-suited for use in Secure Access Service Edge (SASE)/SD-WAN implementations.

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, predictive routing can be used to ensure acceptable application experience for an online application by initiating routing changes and/or other network configuration changes, in advance of predicted degradations in the application experience. However, enterprise networks often connect to hundreds of online applications operating over thousands of network paths. Each application is sensitive to certain network metrics (e.g., loss, throughput), and at certain levels of metrics (e.g., voice call may experience degradation at loss >3%, whereas Office365 Sharepoint may experience degradation if available throughput <2 Mbps). Two similar applications may be sensitive to different network metrics or the same network metric, but at different thresholds.

For example, two real-time voice calls may have different loss thresholds based on the audio codec being used a voice application that uses a lossy codec such as Opus may be resistant until a packet loss of up to 30%, where as other audio codecs such as advanced audio coding (AAC) usually is not resilient to such high loss thresholds. Similarly, SaaS applications for Sharepoint may exhibit degradation in their application experience metrics at certain throughput levels, whereas other applications, such as ServiceNow, may have different throughput thresholds. Hence, it is vital for an administrator and other routing engines, such as predictive application aware routing engine 412, to know which applications exhibit degraded experience at what levels on thousands of different paths that are present in a network. This helps to identify the root-cause as to why the paths are providing degraded experience and initiate corrective actions. It is also vital for automating different path selection strategies to avoid bad application experience. In a large network, the challenge is to pinpoint which path metric(s) (i.e., one or a combination of multiple metrics), and at which levels trigger breaking points for different applications. Such breaking points generally correspond to where the application experience switches from being acceptable to being considered degraded/unacceptable.

Current routing technologies mostly utilize static thresholds or rule-based algorithms that are set by expert users (e.g., if the loss exceeds 3% for voice application, then select a different alternative path). Such a manual setting is obviously ineffective as the number of applications scales. Moreover, most SaaS applications, such as Webex, are being upgraded routinely to use better resilient mechanisms which network expert might not be able to track. Similarly, interpretable machine learning models that predict application experience as a function of metrics also do not suffice for this purpose. Indeed, many prediction algorithms operate by providing some score (e.g., feature importance or instance importance), but this does not accurately quantify at what levels the breaking points occur, as well as the degree of confidence or uncertainty.

For example, consider when an application may have provided bad experience as a function of observed path latency. The predictive model may figure out that latency is an important feature if it observes: 1.) when the latency was 150 is the application usually exhibited bad application experience and 2.) when the latency was between the range of [200 ms-300 ms], the application experience was acceptable. While the model learns that latency was an important feature, such a relationship does not indicate any breaking point with respect to the latency. Hence, when the model figures out that latency is an important predictor for the application experience, the path latency also does not have a breaking point that can help explain the reason for the application degradation.

Detecting Application Performance Breaking Points Based on Uncertainty and Active Learning The techniques herein introduce systems and methods to determine a set of metrics and the thresholds at which different online applications experience degradation. On finding uncertainty in these relationships, the techniques herein further use active learning to automatically suggest where new levels of breaking points can be tested. experimented. Another aspect of the techniques herein relates to providing any identified breaking points for display. Such information can be shows, for instance, in conjunction with the associated uncertainty, as well as suggestions to fix the problem including the best levels to test, if a breaking point has not yet been found. In further aspects, the techniques herein also provide for integration with the routing mechanism of the network, to initiate corrective measures, based on the identified breaking points, such as rerouting the application traffic to 'better' path(s) in the network.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device obtains path metrics for a network path via which traffic for an online application is conveyed. The device models uncertainty of an application experience metric predicted for the online application based on the path metrics. The device identifies, based on the uncertainty of the application experience metric modeled by the device, a breaking point in the path metrics at which the application experience metric predicted for the online application is expected to switch from being acceptable to being degraded. The device provides the breaking point in the path metrics for display.

Figure 5:
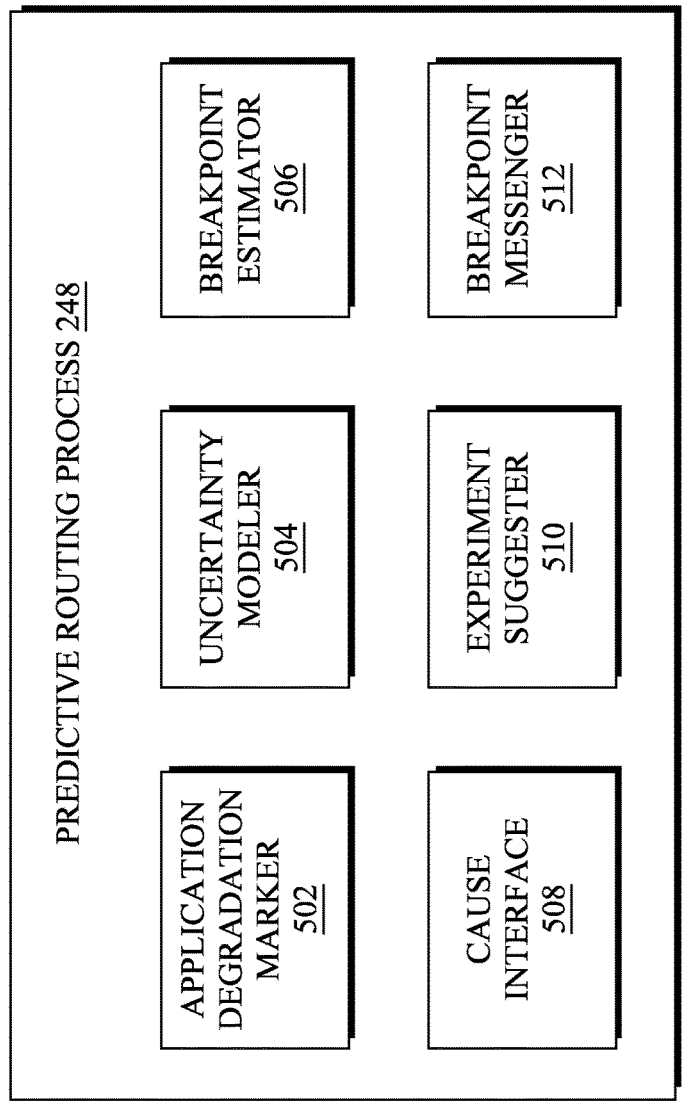
FIG. 5 illustrates an example architecture for detecting application performance breaking points based on uncertainty and active learning.

Operationally, FIG. 5 illustrates an example architecture 500 for detecting application performance breaking points based on uncertainty and active learning, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), another device or service in communication therewith, or the like. In some embodiments, for instance, predictive routing process 248 may be used to implement a predictive application aware routing engine, such as predictive application aware routing engine 412.

As shown, predictive routing process 248 may include any or all of the following components: an application degradation marker 502, an uncertainty modeler 504, a breakpoint estimator 506, a cause interface 508, an experiment suggester 510, and/or a breakpoint messenger 512. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

For simplicity, it is presumed that predictive routing process 248 has access to a datalake of path metrics, QoE metrics, and the like for any number of online applications accessed via the network. Such a datalake may be maintained by predictive routing process 248 or by another process in the network. For instance, the datalake may store metrics collected from the various routers or other networking devices, the online applications themselves, or other information sources. By way of example, the datalake may include health metrics collected from different probes (such as BFD) that indicate path metrics such as loss, latency, jitter, throughput, metrics for a particular device along that path/tunnel (e.g., cumulative throughput observed at a particular endpoint, resource usage metrics, etc.), or the like, on any or all tunnels and/or direct Internet access (DIA) paths. The datalake may also include NetFlow data that describes the application usage in the network. If available, the datalake may further store feedback data available from the various online applications, such as user-provided ratings as to the application experience. This application feedback data can be a continuous number or a discrete value (such as good, degraded, bad, or no-opinion) and/or may also comprise multiple feedback metrics.

Application degradation marker 502 may be responsible for marking the points in time when a path (tunnel or a DIA path) has experienced application degradation using the application experience metric(s) (e.g., QoE metrics from the application, SLA violations as a proxy, etc.). Several applications may provide the application feedback in terms of application scores or other application relevant metrics. For example, voice and video conferencing applications such as Webex or Teams may provide metrics observed at the decoder (e.g., concealment time when the decoder fills the missed packets with "filler" data) or a rating (e.g., a score out of 10 or discrete metrics such as 'good,' 'degraded,' or 'bad'). If such application feedback is available, then the paths which had bad calls can be flagged by application degradation marker 502 as exhibiting application degradation. In one embodiment, the fraction of the application sessions which had a 'bad' or 'degraded' call, or the average or 10th percentile of the application score can be used to quantify the application degradation.

When a direct application feedback metric is not available for the application experience metric, but Service-Level Agreement (SLA) templates are available, they can be used as a proxy for the application experience metric. For example, voice calls can be rated based on loss, latency, and jitter on the path. In one instance, a voice call can be quantified as violating SLA template if loss >3%, round-trip latency >300 ms, or jitter >50 ms. Based on this, application degradation marker 502 can mark the fraction of the time when the SLA is violated (say, in a 10-min window) on each path.

In various embodiments, uncertainty modeler 504 may be responsible for modeling application degradation as a function of a single metric or a set of metrics. In some embodiments, uncertainty modeler 504 may also model the uncertainty at different values of the metric. In one embodiment, all of the metrics that may contribute to the application experience metric may be considered as univariate features and model the application experience with respect to each feature using an uncertainty estimating machine learning approach, such as a Gaussian Process.

For example, given application feedback from Webex, uncertainty modeler 504 may deem the networking metrics of loss, latency, jitter, and throughput on the path as predictive features. In turn, uncertainty modeler 504 may model the application experience metric as a function of each feature. Note that if an SLA template-based approach is chosen for the experience metric (e.g., because direct feedback is not available), then the path metrics that form the template may be excluded as features since these metrics deterministically (by definition) define application degradation.

Figure 6:
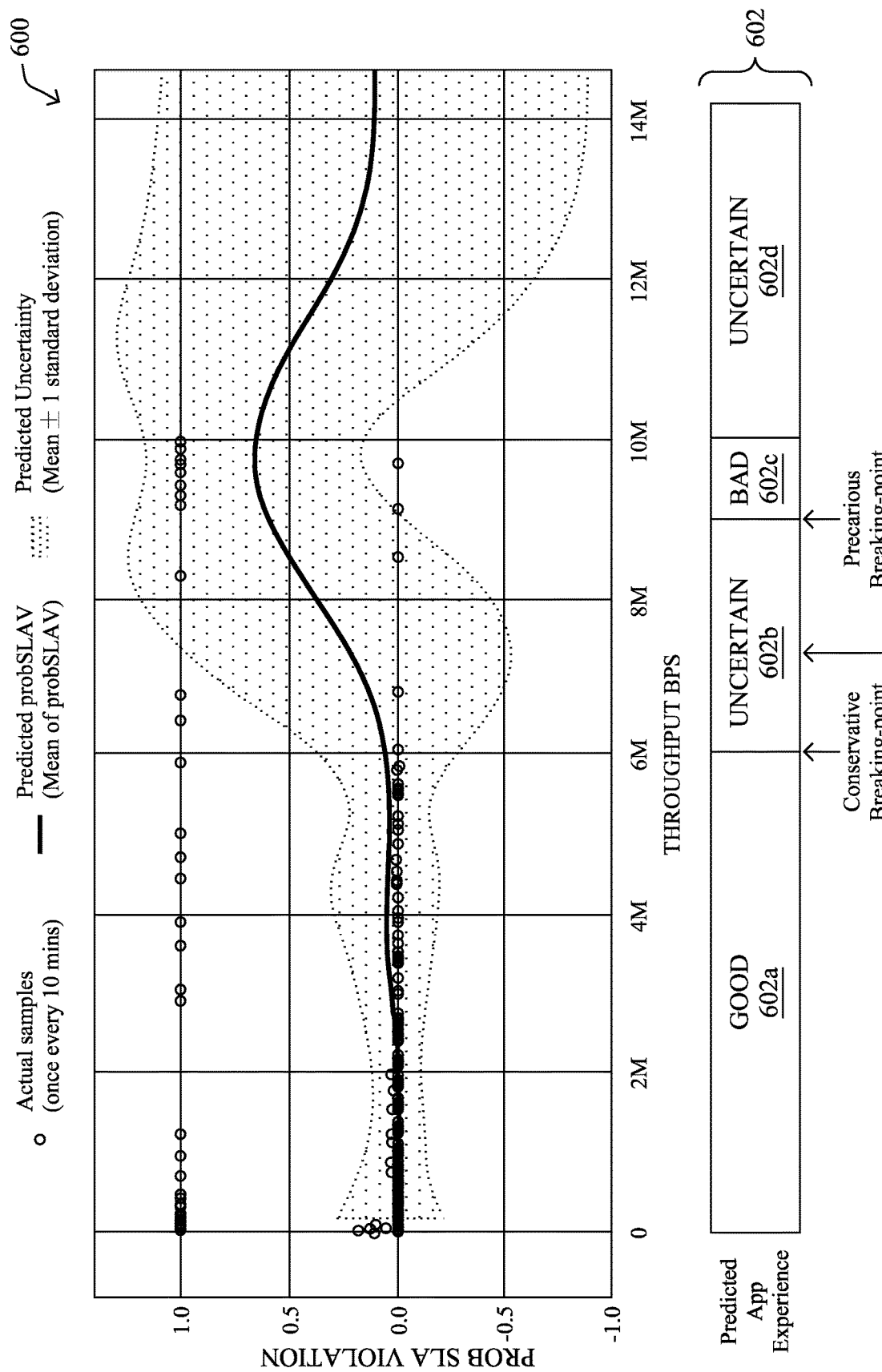
FIG. 6 illustrates an example plot of an application experience metric versus path metric.

FIG. 6 illustrates an example plot 600 of an application experience metric vs. path metric, according to various embodiments. More specifically, plot 600 demonstrates the fraction of time a network path violated an SLA, referred to as the probability of SLA violation, against the throughput utilized on the path. Uncertainty modeler 504 may model this relationship, for example, using a Gaussian Process. Each point in plot 600 indicates whether the application experience was actually degraded or not and represented by the values '0' and '1,' respectively.

For a given value of throughput, the Gaussian Process of uncertainty modeler 504 will reduce the uncertainty when the density of most observed points has the same value. For example, until throughput <6 Mbps, it can be seen that most of the observed points do not have application degradation (prob of SLA violation=0). It can also be seen that at a throughput of 10 Mbps, there are more points with prob SLA violation=1, albeit with high variability. When the data is insufficient (e.g., path throughput between 6 Mbps to 9 Mbps or greater than 10 Mbps), uncertainty modeler 504 will interpolate over this range, but with a high uncertainty at those throughput values. This indicates that the model is not certain what the application experience would be at such throughput values.

Thus, there are different ranges 602 for the path throughput that can be seen in plot 600:

A 'good' range 602*a* between 0-6 Mbps during which the application experience is considered acceptable. Since there are many actual samples of this observed along the network path, the predicted uncertainty is very low.

A 'bad' range 602*c* between approximately 9-10 Mbps during which the application experience is degraded, based on the samples collected from the path.

A first 'uncertain' range 602*b* between approximately 6 Mbps and 9 Mbps. Here, there are few actual samples of the throughput in this range, leading to a high degree of uncertainty as to the experience metric.

A second 'uncertain' range 602*d* from 10 Mbps onward. In this range, there are no actual samples from the network path, leading to even higher uncertainty.

The model for the above path clearly suggests that the application experience is good until 6 Mbps, but after 6 Mbps the application will possibly deteriorate. In various embodiments, this means that the breaking point for the throughput metric can be set conservatively at 6 Mbps, as an average across range 602*b*, or set precariously at the start of range 602*c*. The administrator and/or routing engine can then utilize this breaking point information to either provision for more available throughput, if the application traffic is indeed heavy, or route over another suitable path.

Figure 7:
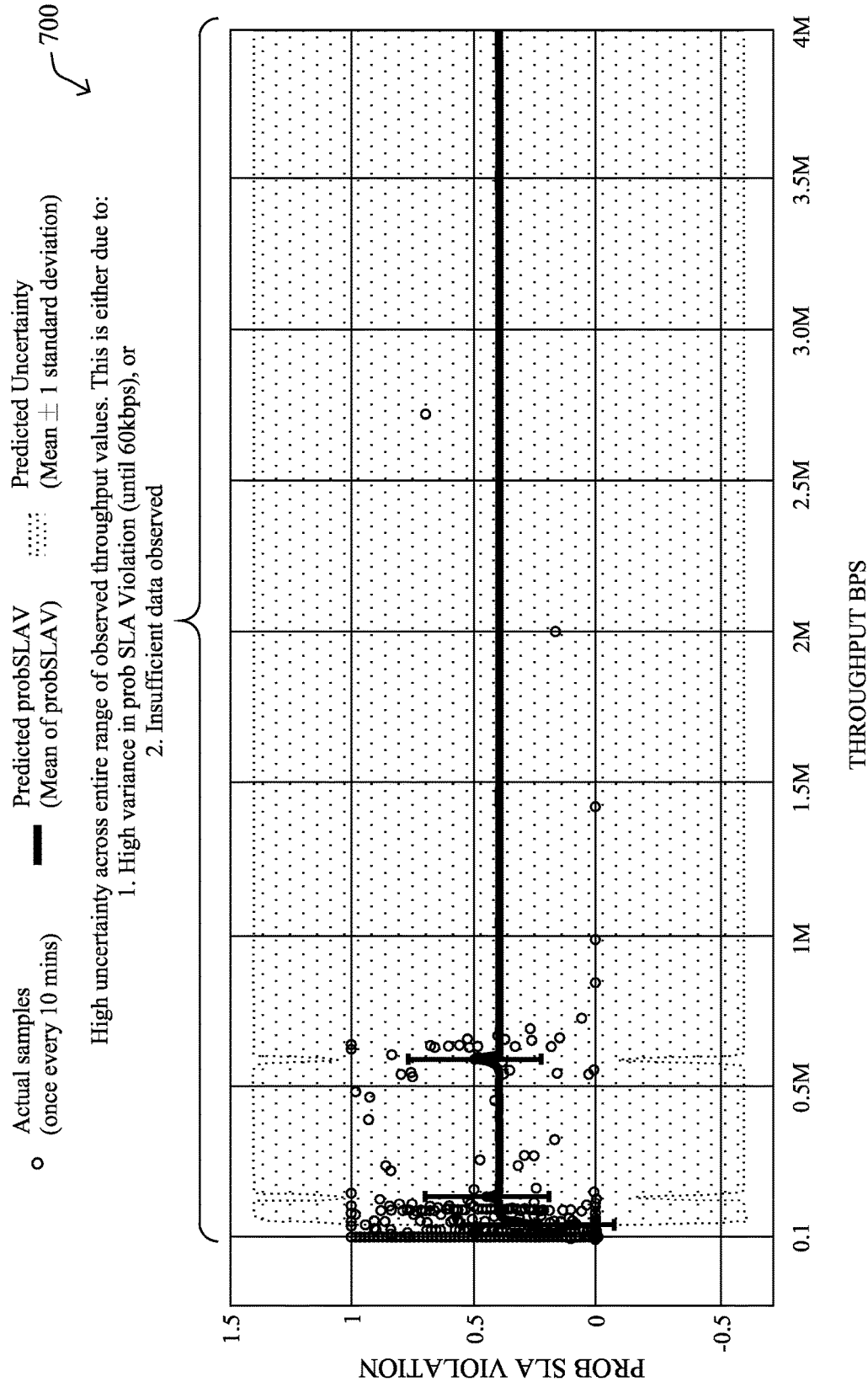
FIG. 7 illustrates another example plot of an application experience metric versus path metric.

FIG. 7 illustrates another example plot 700 of an application experience metric versus path metric. Similar to plot 600, plot 700 in FIG. 7 also shows the probability of SLA violation vs. path throughput. However, in this instance, there is high uncertainty across the entire range of observed throughput values. This can be due to either: 1.) high variance in the application experience metric for observed throughput values (e.g., when the throughput <60 kbps or around 0.5 Mbps) or 2.) there are not enough actual samples from the path at other throughput values to be certain that the throughput causes degraded application experience. Hence, the throughput for this path cannot be considered as a possible cause of application degradation, based on what has been observed so far.

Referring again to FIG. 5, in other embodiments, uncertainty modeler 504 may take multiple features (e.g., loss, latency, jitter, throughput, etc.), and then model them as a Gaussian Process of multiple features. Doing so would provide "regions" where the application experience would be good or degrade. For example, a model of Gaussian Process as a function of throughput and loss will be able to infer, say, that a throughput >x and loss >y, will lead to bad application experience with very low uncertainty.

Breakpoint estimator 506 may be responsible for finding the features for the path where breaking points occurs and ranking the features for each path, in various embodiments. In one embodiment, for each <application, feature> pair, the output of the model may be utilized to determine one metric: predicted application experience. For example, for the path associated with plot 600 in FIG. 6, breakpoint estimator 506 may determine the predicted application experience metric by selecting the cutoff where the prob. SLA Violation value is near-zero (upper bound of uncertainty <=0.3). The largest value where such upper-bound (e.g., 6 Mbps) and range of good application experience is [0-6 Mbps], which breakpoint estimator 506 can then flag as the 'conservative' breaking point, since it is known with high certainty that application experience is good below a path throughput of 6 Mbps. In other instances, breakpoint estimator 506 may mark the "precarious breaking point" at the lower bound when application experience is bad (with low uncertainty) at the start of range 602c. In yet another instance, the breakpoint estimator 506 may flag the "average breaking point" as the average throughput value along range 602b. The network administrator and/or routing engine can then utilize this breaking point information to either provision for more available throughput, if the application traffic is indeed heavy, or route over another suitable path.

In some embodiments, breakpoint estimator 506 may then rank the features (e.g., by assigning a score) for each <application, path> as a function of the uncertainty observed before the breaking point. It may also consider other factors such as range of high uncertainty (e.g., range 602b and range 602d in FIG. 6) in the predicted application experience before the breaking point, etc. In turn, breakpoint estimator 506 may then sort the paths by score. Of course, uncertainty modeler 504 and breakpoint estimator 506 may compute the breaking point(s) for all active applications and paths seen on the network periodically (e.g., every day) or on demand (e.g., as requested by an administrator).

Another potential component of predictive routing process 248 is cause interface 508, which is responsible for providing the possible metrics, respective breaking points, and/or possible suggestions to fix the problem for display to an administrator. In one embodiment, cause interface 508 may show a top <path, application> with corresponding ranking and breaking points. Per-application top paths with breaking points can also be provided for display by cause interface 508. These can be directly fetched by cause interface 508 from the output of breakpoint estimator 506, for instance. In other embodiments, a collective set of paths' predicted mean (or other aggregate) application experience metric (e.g., prob. SLA violation) for each feature can be provided for display.

Figure 8A:
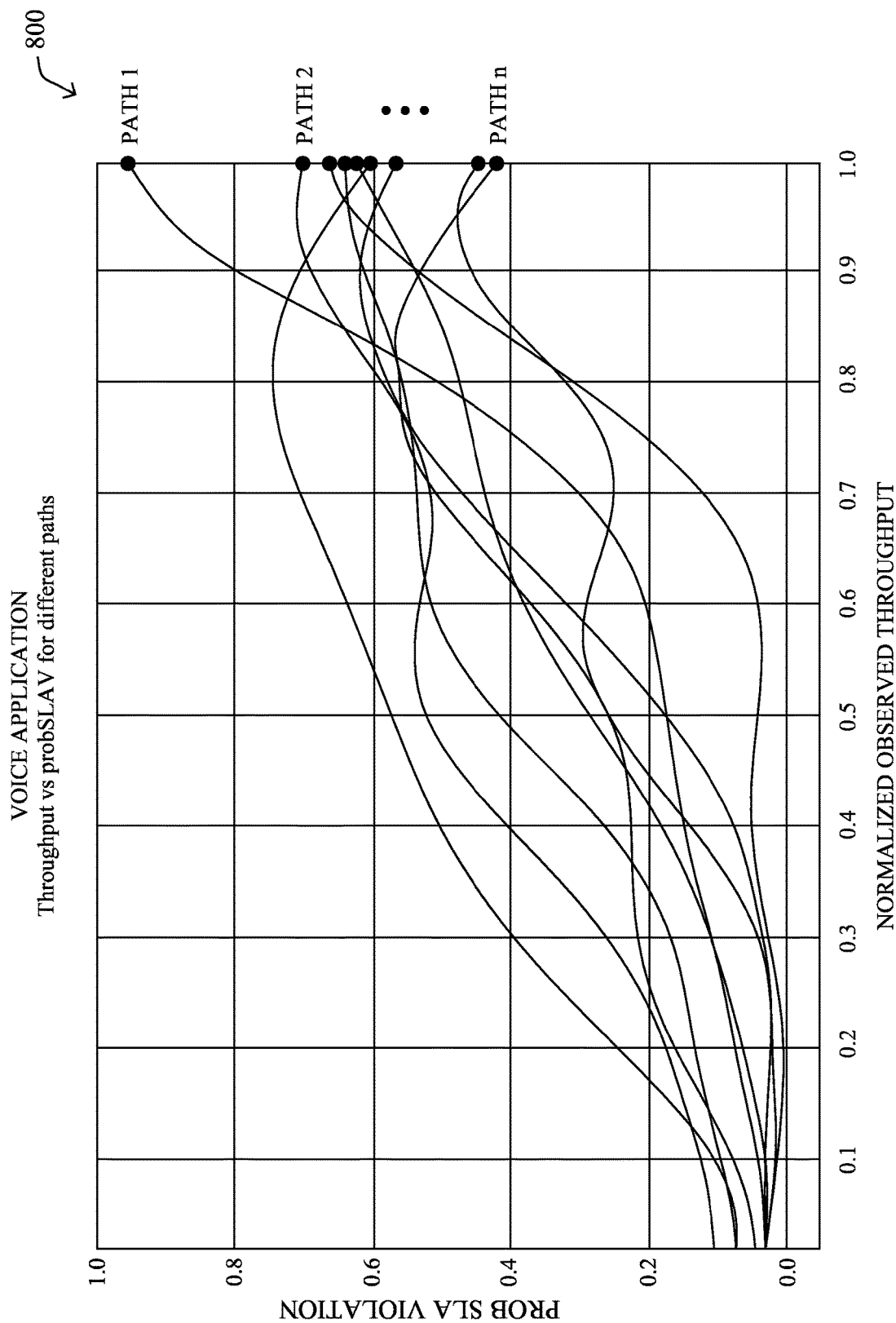
FIGS. 8A-8B illustrate example plots of application experience metrics versus path metrics for different online applications.
Figure 8B:
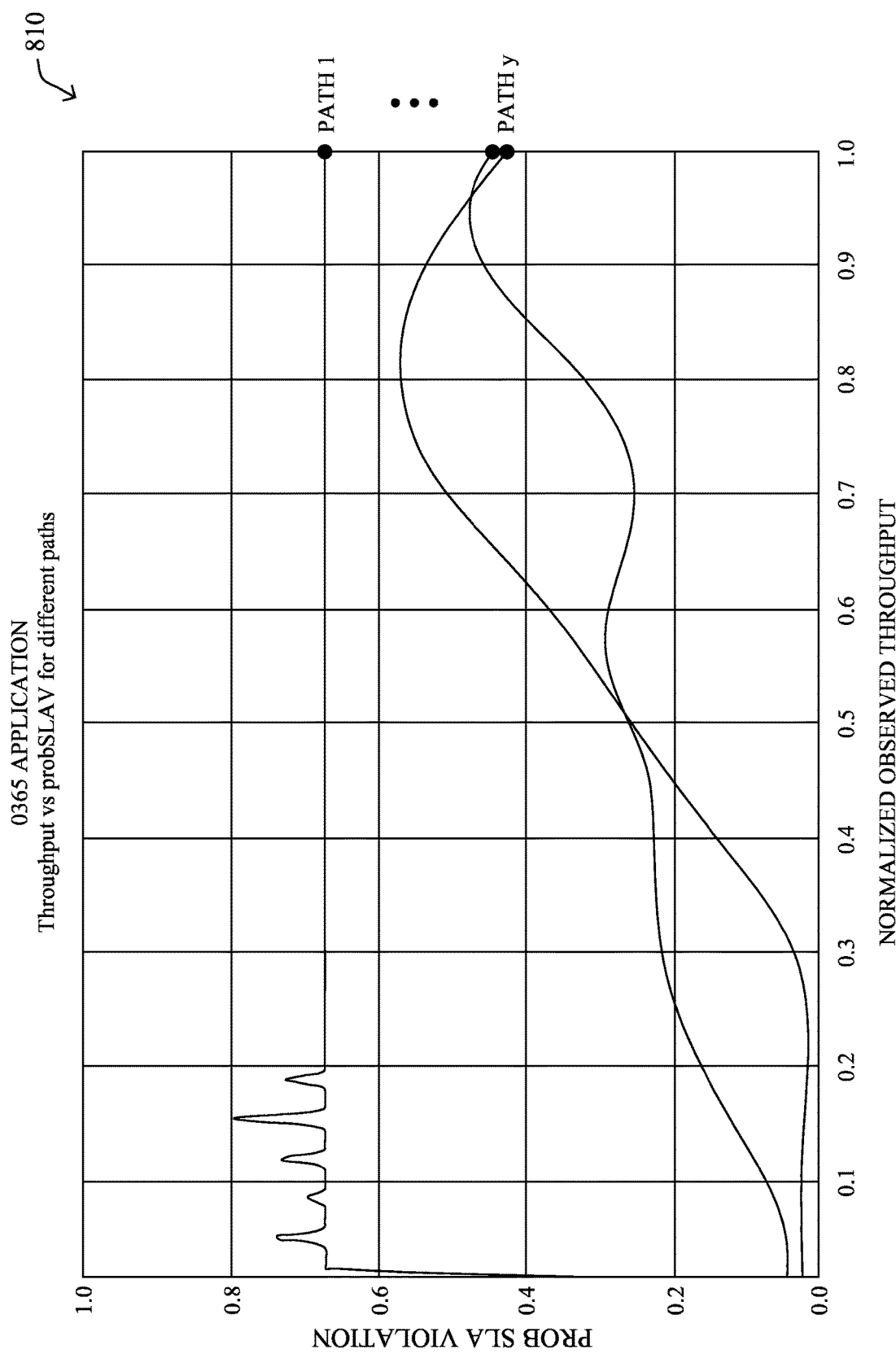

FIGS. 8A-8B illustrate example plots of 800-810 of application experience metrics vs. path metrics for different online applications that could be provided by cause interface 508 for display. More specifically, plot 800 shows the prob. SLA violation metric vs. the normalized observed throughput for the n-number of different paths via which traffic for a voice application was conveyed. Similarly, plot 810 shows the same information, but this time for an Office365 (O365) application whose traffic was conveyed over y-number of different network paths. Each path in plots 800-820 are shown as one line with each application having its own plot for display.

As would be appreciated, displaying the normalized throughput in this manner helps the network administrator to visualize which paths may have breaking points based on the maximum observed throughput, since there may be paths with varying throughputs across the network. It can be readily switched to actual throughput values for display by cause interface 508, if desired, in one embodiment. The administrator can clearly pick paths where drastic increase in prob SLA violations can be spotted, and upon selecting the path, a more detailed view, such as plot 600 in FIG. 6, could also be shown by cause interface 508. Other visually interactive methods may also be employed by cause interface 508 to present information to the administrator based on the raw data in the datalake and/or the outputs of uncertainty modeler 504 and breakpoint estimator 506.

Referring yet again to FIG. 5, predictive routing process 248 may also include experiment suggester 510, which is responsible for picking the application, path(s), and feature value(s)/path metrics where more data is needed by breakpoint estimator 506 to identify breaking points. This is useful for refining the breaking point estimates by carefully measuring the application experience at the feature values through the conduction of experiments along the path(s).

For example, in the case shown in FIG. 6, cause interface 508 may present 6 Mbps to the administrator as a conservative breaking point for a voice application, but also indicate that 6-9 Mbps has an increasing prob SLA Violation, but with a very high uncertainty. In such a case, experiment suggester 510 may suggest to the administrator that more exploration should be done in throughput range 602b for that path. This can be achieved, for instance, by identifying paths which seem sensitive to a feature in certain regions (e.g., 'good' and 'bad' predicted application experience in FIG. 6). If there are long 'uncertain' ranges (e.g., a gap between good and bad regions and more than a certain threshold, such as a range that spans more than 2 Mbps), then experiment suggester 510 may flag such paths for further experimentation. Experiment suggester 510 may also suggest the values of the features with most uncertainty (e.g., it may suggest experimenting at 8 Mbps for the path associated with plot 600 in FIG. 6). In turn, the network administrator may then return an instruction to set up additional traffic or inject additional application traffic along that path, to measure application experience at this point. Once the resulting sample data is obtained from this experiment, uncertainty modeler 504 and breakpoint estimator 506 can then refine the breaking point estimates for the path.

Breakpoint messenger 512 may be responsible for conveying an identified breaking point to the path endpoints or other engines having control in the network, such as a routing engine, in various embodiments. To do so, breakpoint messenger 512 may utilize the output of breakpoint estimator 506, and then propagate a custom message to the path routers (e.g., routers at the endpoints of the path) and/or to the network controller, to indicate that the path is experiencing application experience degradation at features values greater or lesser than a certain level. Upon reception of this message, the routers or the routing engine can then take corrective action. As an example, if the breaking point of voice is observed at 6 Mbps in FIG. 6, the routing engine may redirect all application flows on another path, if the interface is currently experiencing a throughput nearing 6 Mbps. It may also redirect other throughput non-sensitive applications on other paths, and direct the given application's traffic on this interface, since this will reduce the currently utilized throughput on the interface to accommodate new traffic.

A predictive routing engine (e.g., predictive application aware routing engine 412) may also use the information from breakpoint messenger 512 as input for path selection, in some embodiments. For example, if the routing engine has decided to route traffic for application A on path P, and then it observes that the throughput is exceeding the breaking point, it may disable the path P for the application traffic, and choose the next best path. It may also use this as a feature to predict best possible path for an application, based on current or predicted feature(s)/path metrics (e.g., throughput). In yet another embodiment, another potential corrective measure would be to reshuffle routing of all applications to different paths according to the estimate of throughput sensitivity. For example, if a set S1 of applications are not throughput sensitive and another set S2 of application are throughput sensitive, various strategies may be used so as to redirect/reroute most traffic along non-throughput sensitive traffic and other application traffic from S2 over less loaded paths.

Figure 9:
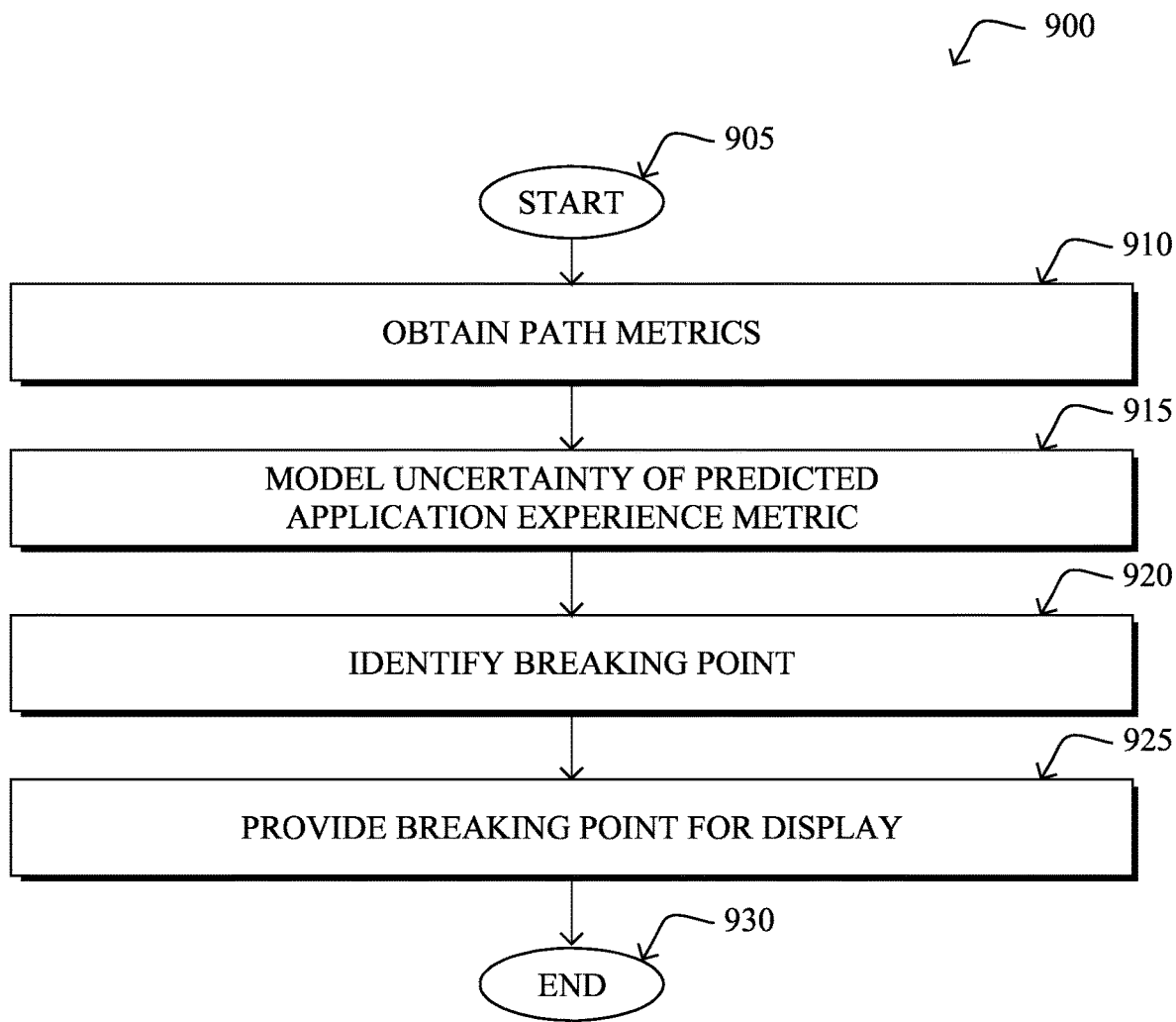
FIG. 9 illustrates an example simplified procedure for detecting application performance breaking points based on uncertainty and active learning.

FIG. 9 illustrates an example simplified procedure 900 (e.g., a method) for detecting application performance breaking points based on uncertainty and active learning, in accordance with one or more embodiments described herein. For example, a non-generic, specifically configured device (e.g., device 200), such as controller for a network (e.g., an SDN controller, a cloud-based device, etc.), an edge router, or other device in communication therewith, may perform procedure 900 by executing stored instructions (e.g., predictive routing process 248). The procedure 900 may start at step 905, and continues to step 910, where, as described in greater detail above, the device may obtain path metrics for a network path via which traffic for an online application is conveyed. For instance, the online application may be an SaaS application, in some embodiments. In various embodiments, the path metrics comprise at least one of: loss, jitter, delay, throughput, or metrics from a particular device associated with the network path.

At step 915, as detailed above, the device may model uncertainty of an application experience metric predicted for the online application based on the path metrics. In some embodiments, the application experience metric is predicted by a machine learning model for the online application. In one embodiment, the application experience metric comprises a service level agreement associated with the network path. In another embodiment, the application experience metric is based on feedback provided by users of the online application.

At step 920, the device may identify, based on the uncertainty of the application experience metric modeled by the device, a breaking point in the path metrics at which the application experience metric predicted for the online application is expected to switch from being acceptable to being degraded, as described in greater detail above. In some embodiments, the breaking point in the path metrics is located in a region of high uncertainty of the application experience metric predicted for the online application. In various embodiments, the device may identify the breaking point by causing performance of an experiment along the network path, to obtain one or more samples from the network path, wherein the breaking point is identified based in part on those one or more samples. In one embodiment, the device may also cause performance of an experiment along the network path, to obtain one or more samples from the network path, whereby the breaking point is identified based in part on those one or more samples. In another embodiment, the device may recommend the experiment to a user interface, whereby the device causes performance of the experiment in response to an instruction to do so from the user interface.

At step 925, as detailed above, the device may provide the breaking point in the path metrics for display. In one embodiment, the device may also initiate, based on the breaking point, a reroute of at least a portion of the traffic of the online application. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for detecting application performance breaking points based on uncertainty and active learning, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, path metrics for a network path via which traffic for an online application is conveyed;

modeling, by the device, uncertainty of an application experience metric predicted for the online application based on the path metrics;

identifying, by the device and based on the uncertainty of the application experience metric modeled by the device, a breaking point in the path metrics at which the application experience metric predicted for the online application is expected to switch from being acceptable to being degraded, wherein the breaking point in the path metrics is located in a region of higher uncertainty of the application experience metric than a region where the application experience metric is predicted to be acceptable for the online application; and providing, by the device, the breaking point in the path metrics for display.

2. The method as in claim 1, wherein the application experience metric comprises a service level agreement associated with the network path.

3. The method as in claim 1, wherein the path metrics comprise at least one of: loss, jitter, delay, throughput, or metrics from a particular device associated with the network path.

4. The method as in claim 1, wherein identifying the breaking point in the path metrics comprises:

causing performance of an experiment along the network path, to obtain one or more samples from the network path, wherein the breaking point is identified based in part on those one or more samples.

5. The method as in claim 4, further comprising:

recommending the experiment to a user interface, wherein the device causes performance of the experiment in response to an instruction to do so from the user interface.

6. The method as in claim 1, further comprising:

initiating, by the device and based on the breaking point, a reroute of at least a portion of the traffic of the online application.

7. The method as in claim 1, wherein the application experience metric is predicted by a machine learning model for the online application.

8. The method as in claim 1, wherein the online application is a software-as-a-service (SaaS) application.

9. An apparatus, comprising:

one or more network interfaces;

a processor coupled to the one or more network interfaces and configured to execute one or more processes; and a memory configured to store a process that is executable by the processor, the process when executed configured to:

obtain path metrics for a network path via which traffic for an online application is conveyed;

model an uncertainty of an application experience metric predicted for the online application based on the path metrics;

identify, based on the uncertainty of the application experience metric modeled by the apparatus, a breaking point in the path metrics at which the application experience metric predicted for the online application is expected to switch from being acceptable to being degraded, wherein the breaking point in the path metrics is located in a region of higher uncertainty of the application experience metric than a region where the application experience metric is predicted to be acceptable for the online application; and provide the breaking point in the path metrics for display.

10. The apparatus as in claim 9, wherein the application experience metric comprises a service level agreement associated with the network path.

11. The apparatus as in claim 9, wherein the path metrics comprise at least one of: loss, jitter, delay, throughput, or metrics from a particular device associated with the network path.

12. The apparatus as in claim 9, wherein the apparatus identifies the breaking point in the path metrics by:

causing performance of an experiment along the network path, to obtain one or more samples from the network path, wherein the breaking point is identified based in part on those one or more samples.

13. The apparatus as in claim 12, wherein the process when executed is further configured to:

recommend the experiment to a user interface, wherein the apparatus causes performance of the experiment in response to an instruction to do so from the user interface.

14. The apparatus as in claim 9, wherein the process when executed is further configured to:

initiate, based on the breaking point, a reroute of at least a portion of the traffic of the online application.

15. The apparatus as in claim 9, wherein the application experience metric is predicted by a machine learning model for the online application.

16. A tangible, non-transitory, computer-readable medium storing program instructions that cause a device to execute a process comprising:

obtaining, by the device, path metrics for a network path via which traffic for an online application is conveyed;

modeling, by the device, uncertainty of an application experience metric predicted for the online application based on the path metrics;

identifying, by the device and based on the uncertainty of the application experience metric modeled by the device, a breaking point in the path metrics at which the application experience metric predicted for the online application is expected to switch from being acceptable to being degraded, wherein the breaking point in the path metrics is located in a region of higher uncertainty of the application experience metric than a region where the application experience metric is predicted to be acceptable for the online application; and providing, by the device, the breaking point in the path metrics for display.

\* \* \* \* \*

UNITED STATES PATENT AND TRADEMARK OFFICE
CERTIFICATE OF CORRECTION

| | | |
|---|---|---|
| PATENT NO. | : 12,199,839 B2 | Page 1 of 1 |
| APPLICATION NO. | : 17/708322 | |
| DATED | : January 14, 2025 | |
| INVENTOR(S) | : Vinay Kumar Kolar et al. | |

It is certified that error appears in the above-identified patent and that said Letters Patent is hereby corrected as shown below:

In the Specification

Column 9, Line 22 should read:
made to extend the notion of routing, CSPF, link state Column 12, Line 3 should read:
150 ms the application usually exhibited bad application Signed and Sealed this
Fifteenth Day of July, 2025

Coke Morgan Stewart
*Acting Director of the United States Patent and Trademark Office*